(No Model.) 8 Sheets—Sheet 2.

W. H. MADDOCK.
ROLLING MILL APPLIANCE.

No. 439,078. Patented Oct. 21, 1890.

WITNESSES.
INVENTOR.

(No Model.)

W. H. MADDOCK.
ROLLING MILL APPLIANCE.

Patented Oct. 21, 1890.

WITNESSES.

INVENTOR.
William H. Maddock (No Model.)　　　　　W. H. MADDOCK.　　　8 Sheets—Sheet 5.
ROLLING MILL APPLIANCE.

No. 439,078.　　　　　　　　　　Patented Oct. 21, 1890.

WITNESSES:　　　　　　　　　　　　　INVENTOR.

(No Model.)  8 Sheets—Sheet 7.

W. H. MADDOCK.
ROLLING MILL APPLIANCE.

No. 439,078.  Patented Oct. 21, 1890.

WITNESSES.  INVENTOR.
William H. Maddock (No Model.)

W. H. MADDOCK.
ROLLING MILL APPLIANCE.

No. 439,078.   Patented Oct. 21, 1890.

WITNESSES.
C. M. Clarke
N. B. Corwin

INVENTOR.
William H. Maddock

UNITED STATES PATENT OFFICE.

WILLIAM H. MADDOCK, OF PITTSBURG, PENNSYLVANIA.

ROLLING-MILL APPLIANCE.

SPECIFICATION forming part of Letters Patent No. 439,078, dated October 21, 1890.

Application filed December 14, 1889. Serial No. 333,745. (No model.)

*To all whom it may concern:*

Be it known that I, WILLIAM H. MADDOCK, of Pittsburg, in the county of Allegheny and State of Pennsylvania, have invented a new and useful Improvement in Feed-Tables for Rolling-Mills, of which the following is a full, clear, and exact description, reference being had to the accompanying drawings, forming part of this specification, in which—
Figure 1, Sheet 1, is a general plan view of my improved feed-tables.
Figs. 12 and $12^a$, Sheet 7, are vertical cross-sections on the lines XII XII and $XII^a$ $XII^a$ of Fig. 8, respectively. Fig. $12^b$, Sheet 7, is an enlarged vertical section of the valve 63, taken on the line $XII^b$ $XII^b$ of Fig. 12.
Fig. 15, Sheet 8, is an enlarged vertical cross-section on the line XV XV of Fig. 13.
Fig. 1 is made on a small scale.
Figs. 2 and 3 are on a somewhat larger scale.
Figs. 4 and 5 are on a still larger scale.
Figs. 6, 7, 10, and 11 are on a still larger scale.
Figs. 8 and 9 are on a scale intermediate between the scales of Figs. 5 and 6.
Figs. 12, $12^a$, and $12^b$ are on a scale larger than the scale of Fig. 6.
Figs. 13, 14, and 16 are on a still larger scale,
and Fig. 15 is on a still larger scale.

Like symbols of reference indicate like parts in each.

In this specification I shall describe the parts of my improved feed-table in the following way: First, the construction of the feed-tables themselves and the trucks on which they are supported; second, the preferable arrangement of the distributing pipes and valves for supplying motive fluid to the driven parts of the tables; third, the devices by which the tables are lifted; fourth, the means employed for moving the tables laterally; fifth, the manipulator by which the metal piece may be shifted and centered on the table, and, sixth, the gearing by which the feed-rollers of the tables are driven and the motors which actuate said gearing.

Figure 1:
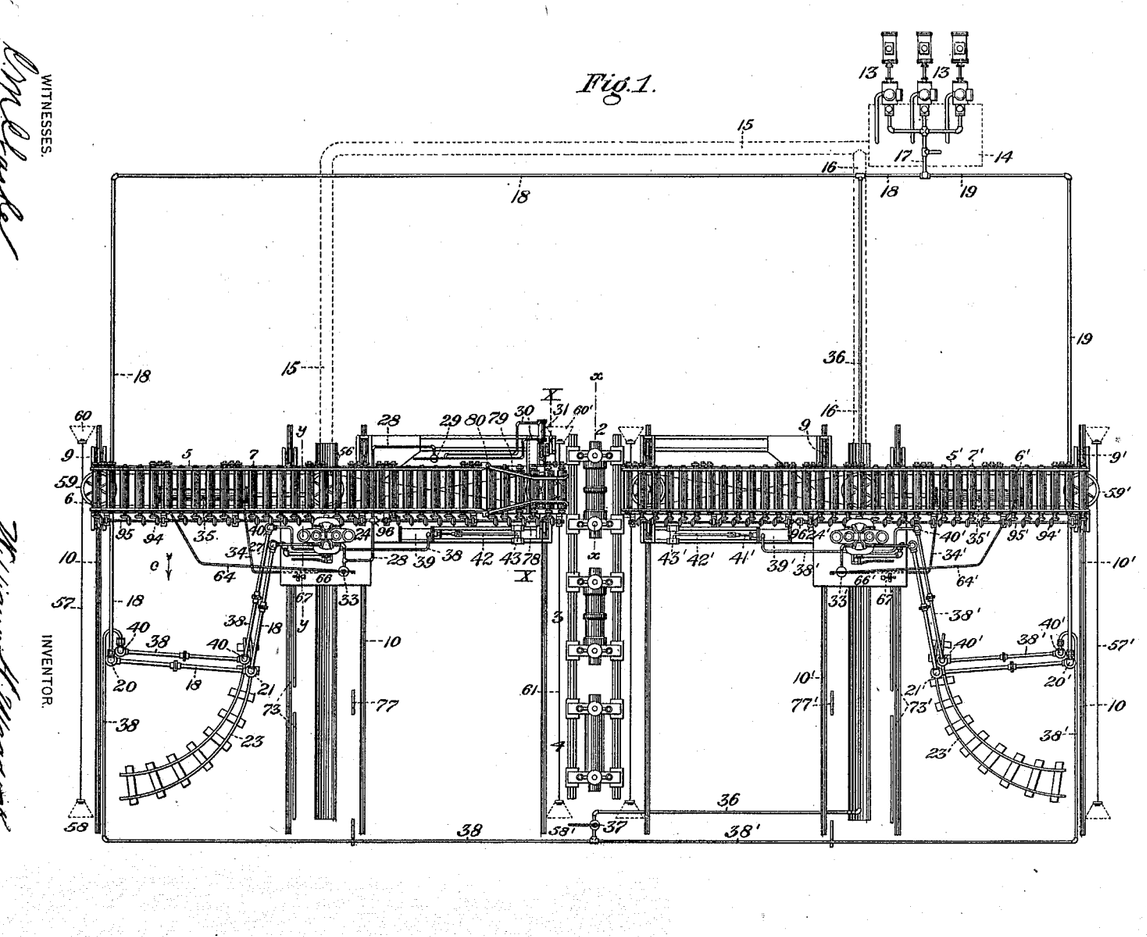
Figure 2:
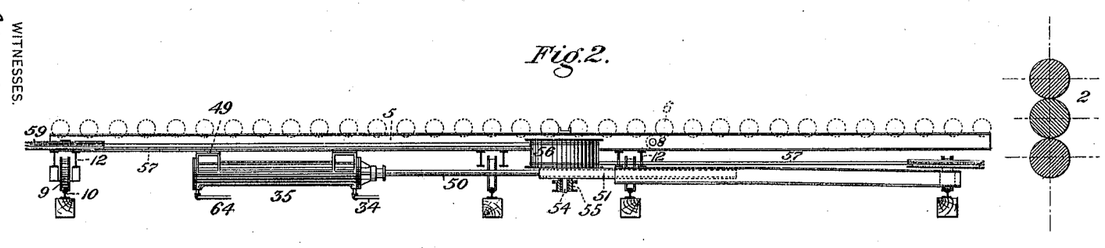
Fig. 2, Sheet 2, is an enlarged skeleton longitudinal section of the hydraulic cylinder and connecting mechanism for moving one of the feed-tables laterally, the section being on the line II II of Fig. 3.
Figure 4:
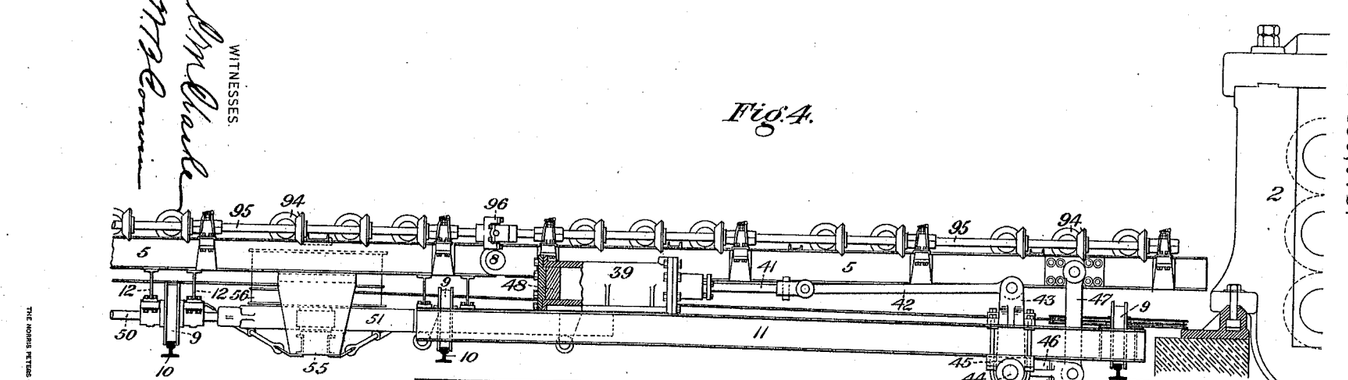
Fig. 4, Sheet 3, is an enlarged side elevation of so much of one of the feed-tables as is included between the lines $x$ $x$ and $y$ $y$ of Fig. 1, showing the mechanism for lifting the table.
Figure 5:
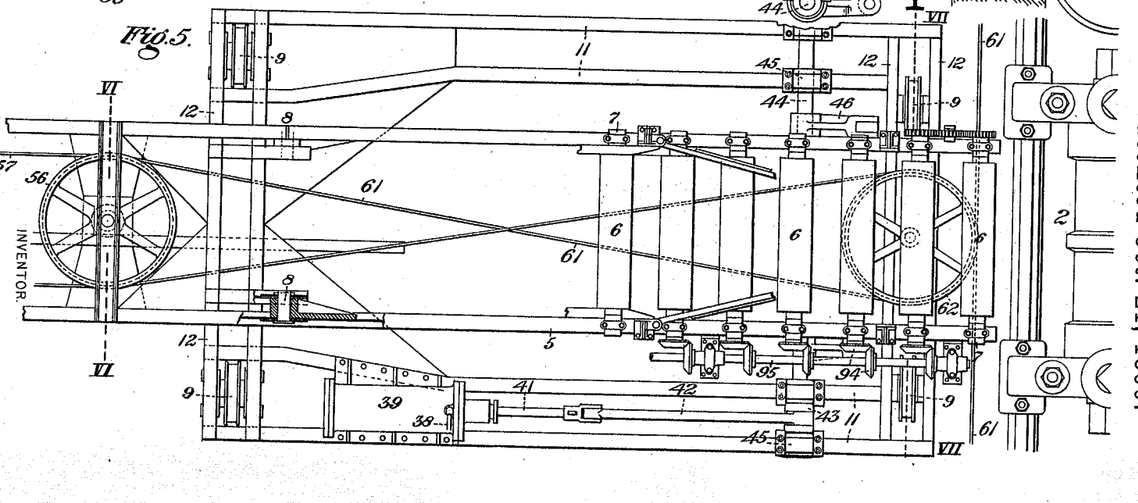
Fig. 5 is a plan view thereof.
Figure 6:
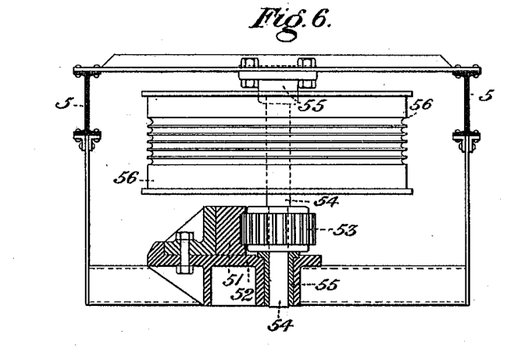
Fig. 6, Sheet 4, is a vertical cross-section on the line VI VI of Fig. 5.
Figure 7:
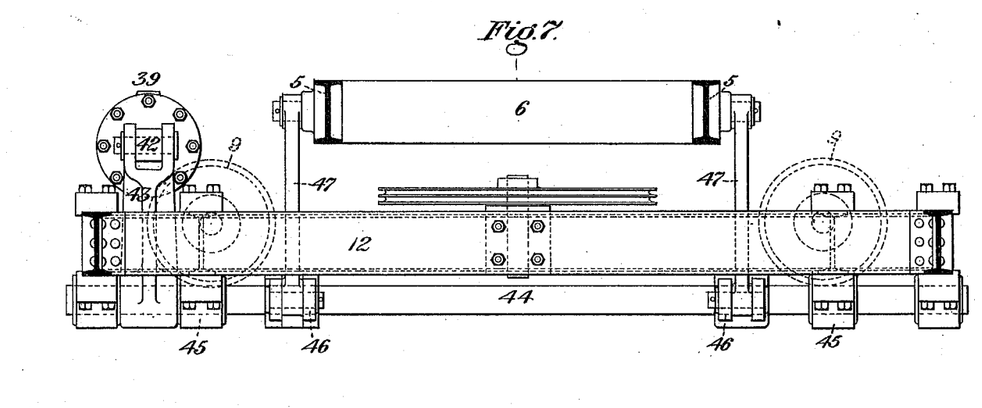
Fig. 7 is a vertical cross-section on the line VII VII of Fig. 5.
Figure 11:
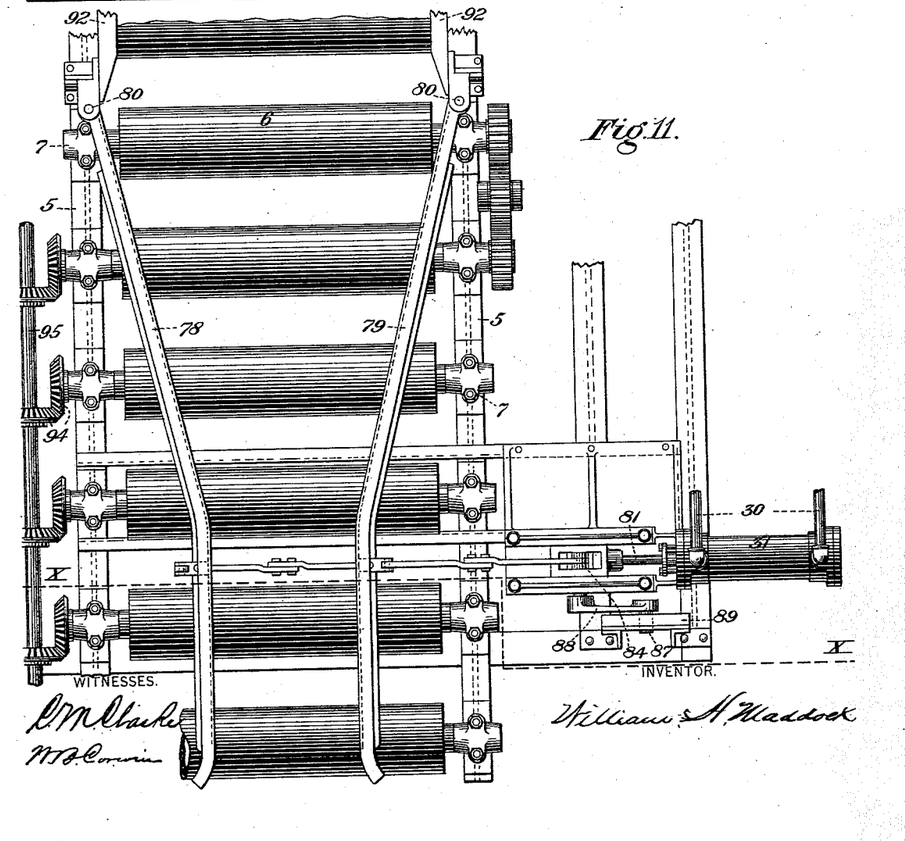
Fig. 11 is a plan view thereof.

1. *Construction of feed-tables and trucks.*—Referring to Figs. 1, 5, and 6 of the drawings, 2, 3, and 4 represent sets of rolls arranged in line with each other and set in housings in the usual way. Some or all of these sets of rolls are three-high, and the function of the feed-tables is to carry the metal piece laterally from one set of rolls to the next in succession and to carry the piece from one pass of the three-high set or sets of rolls to the pass above or below the same. It will be understood, however, that my invention is not limited to any particular arrangement of the rolls, since the lateral motion of the tables may be utilized in shifting the metal piece from one pass of a single set of rolls to another pass or passes at the side thereof. There are two feed-tables—one on each side of the rolls; but as these two tables are or may be similar in construction I shall describe only one of them, it being understood that the same description, *mutatis mutandis*, will apply to the other. The frame of each table is composed of parallel side beams or rails 5, which are connected by suitable braces, (not shown in the drawings,) which may be arranged in the manner heretofore commonly employed in the construction of rolling-mill feed-tables. The feed-rollers 6 are journaled in bearings, hereinafter to be described, supported by pillow-blocks 7 on the side rails 5, Figs. 9 and 11. The table is made in two transversely-divided sections, of which the section farthest from the rolls (the rear section) is not or need not be movable vertically, while the front section is pivotally connected thereto at its rear end by a hinge-joint 8, Figs. 4 and 5, so as to be capable of vertical motion on the axis of this pivotal connection. The entire table is supported by wheels 9, which are adapted to run on tracks 10, extending laterally along the rolls. The sets of wheels under the front section of the feed-table are journaled in a frame or truck 11, which is composed of metal beams, preferably arranged and joined together in the manner shown in Figs. 4 and 5. The sets of wheels under the rear section of the table need not be journaled in such frame, and the table is supported upon the bearings of such wheels by interposed cross-beams 12, to which the frame of the table and the bearings of the wheels are secured, as shown in Fig. 4. It will be understood that in the use of the apparatus the entire table is moved laterally on the wheels 9, and that the front section of the table may be raised upon the pivotal connection 8, so as to lift the metal piece supported thereby from the plane opposite to the lower pass of the rolls, as shown in Figs. 2 and 4, and to direct it in proper position to be delivered into the upper pass, and vice versa. The mechanism by which such motion is effected will be described hereinafter.

Figure 14:
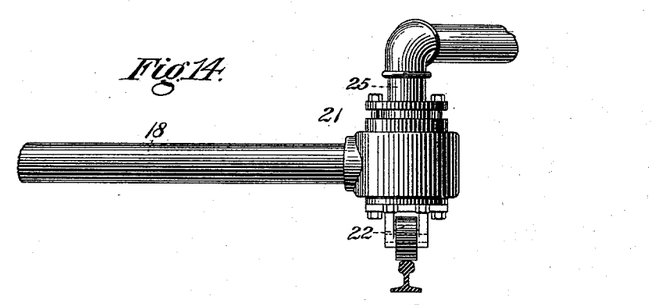
Figure 15:
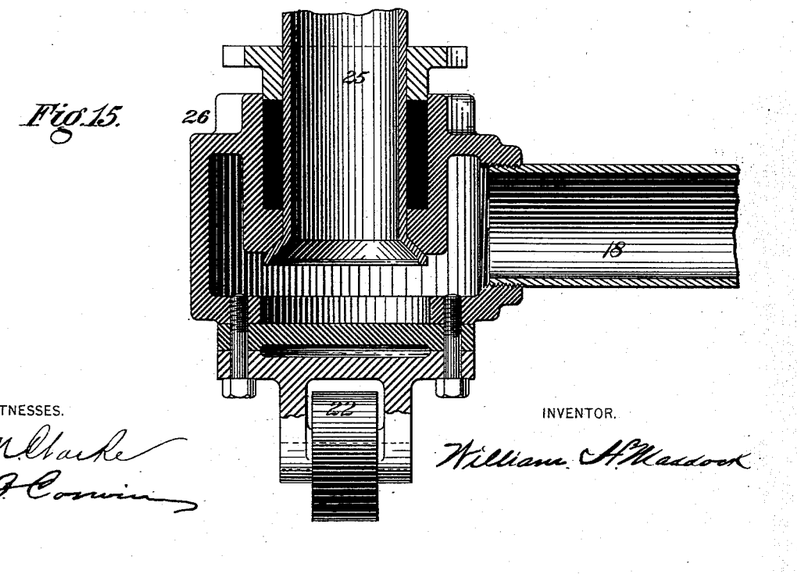
Figure 16:
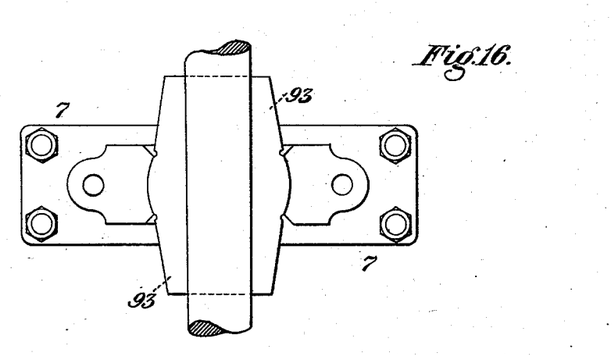
Fig. 16, Sheet 7, is a longitudinal section of the bearings of one of the driven feed-rollers. Of these figures.

II. *The arrangement of the distributing pipes and valves.*—Referring to Fig. 1, 13 is a pump or set of pumps by which water or other motive fluid is supplied to the cylinders and motors of the apparatus. This pump derives its water from a reservoir 14, which is connected by pipes or channels 15 or 16 with the exhaust-pipes of the motors, so that the waste water therefrom is returned to the pump and is utilized repeatedly. The main supply-pipe 17 of the pump is connected with branch pipes 18 and 19. The pipe 18 extends to the roller-driving motor 24 of one of the feed-tables, and in order that it may accommodate itself to the lateral motions of the table it is provided with swinging joints 20, 21, and 27, of which the joint 21 is supported by a wheel 22, which runs upon a curved track 23, and the bearings of which are fixed to the under side of the joint, as shown in Figs. 14 and 15. The internal construction of the swinging joints is shown in Fig. 15. The vertical pipe 25 of each joint fits in a stuffing-box or hollow casting 26, and the inner end of the pipe 25 is flared out into conical shape, so as to fit against a correspondingly-formed concave shoulder at the inner end of the stuffing-box. The pressure of the water acting on the flaring end of the pipe 25 tends to force it against the seat formed by said shoulder, and thus automatically seals the joint and prevents the escape of water. The pipe 18 is provided with a branch 28, leading to a four-way valve 29, connected by pipes 30 with the opposite ends of a cylinder 31, which operates the manipulator. A branch pipe 32 leads from the pipe 28 to a four-way valve 33, connected by pipes 34 and 64 to the opposite ends of a cylinder 35, which supples the power by which the feed-tables are moved laterally. The pipe 19 is connected by branch pipes with the feed-roller-driving motor and the cylinders for lifting the table and moving it laterally, which are situate on the opposite side of the rolls from that just described. These pipes, &c., on both sides of the rolls are similar in construction, and I have marked them with the same reference-figures, distinguished by the prime-mark. 36 is a pipe, which is connected with the pump and extends to a three-way valve 37, which is preferably located on a suitable pulpit, and is connected by branch pipes 38 and 38' with the ends of cylinders 39, which are mounted on the frames of the feed-tables and serve to supply power for lifting the same. Swinging joints 40 40' are interposed in the line of these pipes to permit of the lateral motion of the feed-table.

Figure 3:
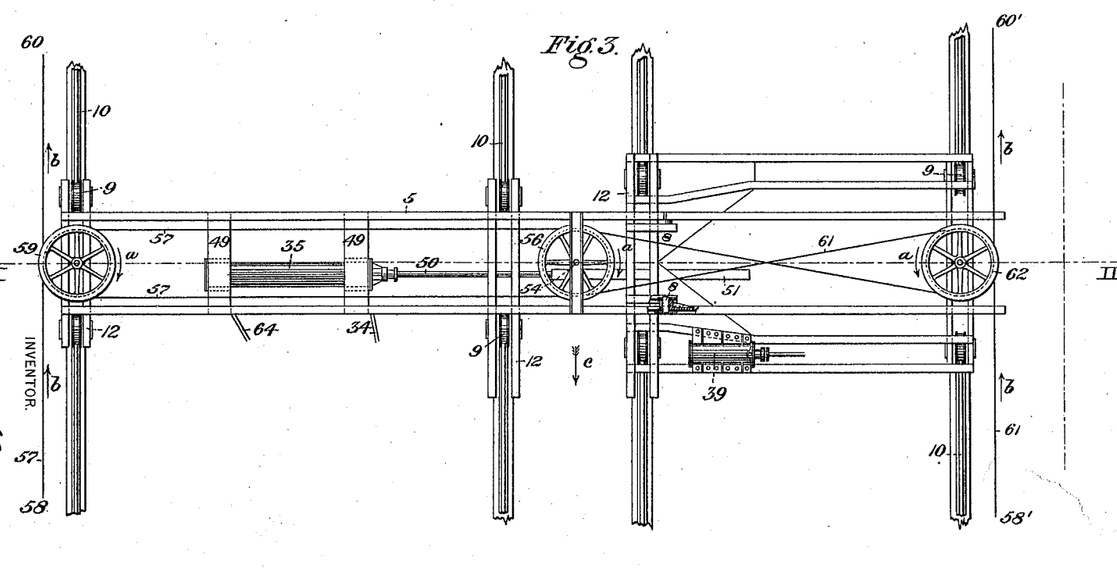
Fig. 3 is a plan view of the same.
Figure 10:
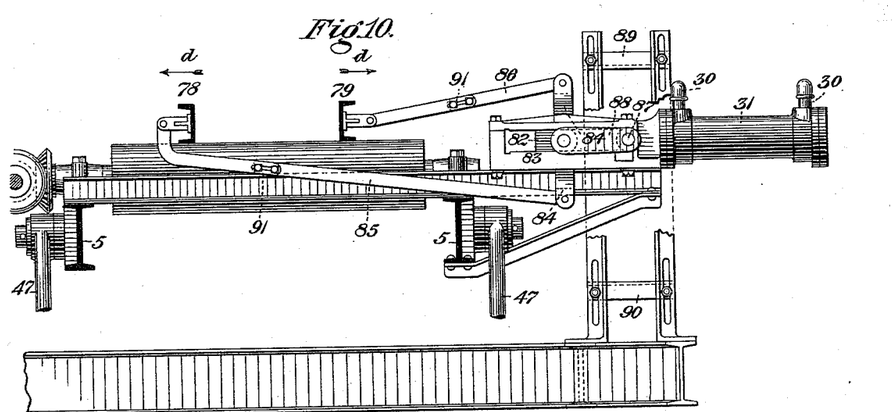
Fig. 10, Sheet 6, is an enlarged cross-section on the line $x$ $x$ of Figs. 1 and 11.

III. *The lifting mechanism of the feed-tables.*—This is best shown in Figs. 4 and 5. The cylinder 39 of each table is mounted upon the frame of the truck 11, Figs. 1 and 3, and its piston-rod 41 is connected by a pitman 42 and crank-arm 43 to a shaft 44, which is journaled beneath the truck 11 in bearings 45, which are supported by the truck, as shown in Fig. 4. The shaft 44 is provided with projecting crank-arms 46, which are pivotally connected by links 47 with the side rails 5 of the front section of the table, Figs. 4 and 10. It follows from this construction that if motive fluid be supplied to the cylinder 39 so as to retract its piston from the position indicated in Fig. 4 the motion of the shaft 44 and crank-arms 46 thereby caused will lift the pivoted front section of the table on the axis 8. In practice I prefer to limit the extent of stroke of said piston, so that when at one extreme the table shall be substantially in the plane of the lower pass of the rolls, and when it is at the other extreme the table shall have been lifted to the upper pass of the rolls. A convenient and desirable way of effecting this in an adjustable manner is to limit the stroke by interposing blocks 48 in the cylinder between the end of the piston and the cylinder-head. In operating the cylinder 39, I find it necessary to supply motive fluid to move the piston only in the direction required to lift the feed-table, its motion in the other direction being effected by the gravity of the table itself, which is permitted to act by exhausting the motive fluid from the cylinder. The fluid-supply pipe, therefore, enters one end only of the cylinder, and the fluid is admitted and exhausted through the same pipe by operation of the three-way valve 32, and as the cylinders of both feed-tables are connected with this valve they are operated simultaneously by motion of the latter.

Figure 8:
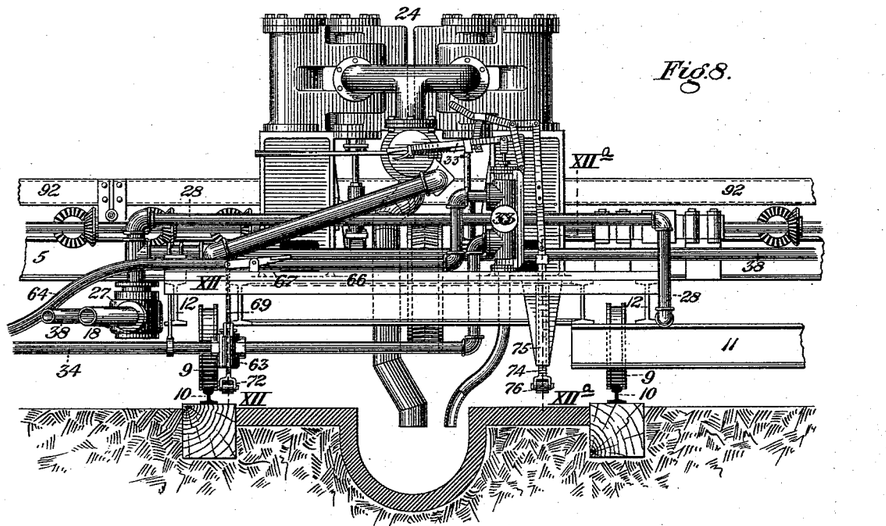
Fig. 8, Sheet 5, is a side elevation of one of the hydraulic motors for driving the feed-rollers.
Figures 12, 12B:
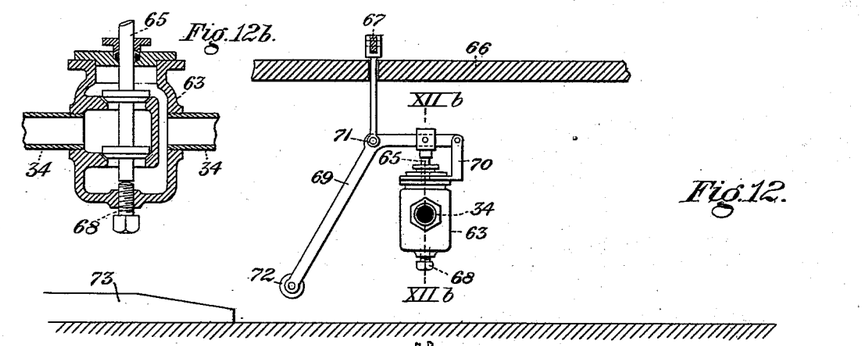
Figure 12A:
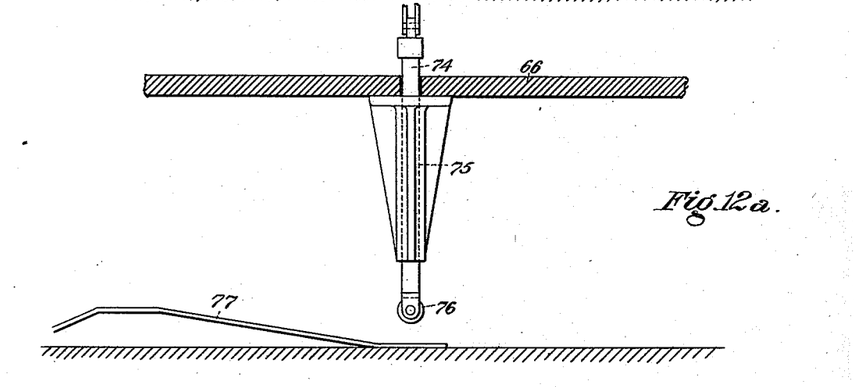
Figure 13:
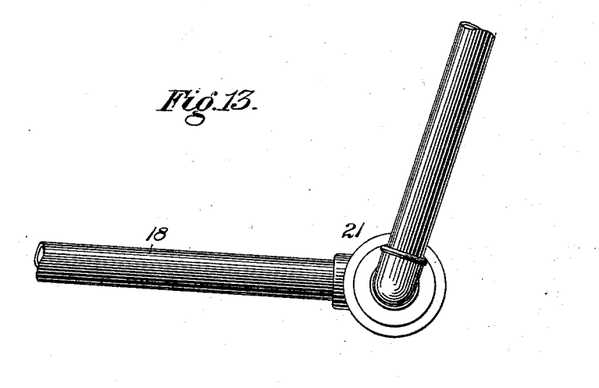
Fig. 13, Sheet 8, is a detached plan view, and Fig. 14 a side elevation, of the stuffing-box connection in the swinging joint between the main water-supply pipe and the cylinders on the table.

IV. *The mechanism for moving the tables laterally.*—This mechanism consists in a motor located on each of the feed-tables, provided with flexible connections—such as cables or wire ropes—by which it is connected with anchors or similar devices located at the sides of the table and independently thereof, so that when the motor is driven it will pull the table and itself with the table in one direction, and when its motion is reversed it shall pull the table in the other direction. I desire to claim, broadly, herein such apparatus, the preferable form and construction of which I shall now describe. Under the rear section of each of the tables, and secured by cross-pieces 49 to the side rails thereof, is a cylinder 35, the piston-rod 50 of which is attached to a toothed rack-bar 51, the latter being supported by suitable slide-bearings 52, which are bolted to the under side of the feed-table frame, Fig. 6. 53 is a toothed pinion keyed to a shaft 54, which is journaled in suitable bearings 55, as shown in the figure last mentioned, the teeth of said pinion being in gear with the teeth of the rack. 56 is a drum, which is mounted on and keyed to the shaft 54, and which is driven in either direction by a longitudinal motion of the rack-bar. 57 is a cable or rope, which is fixed to a post or anchor 58 in the floor of the mill, Fig. 1, and which extends thence around a sheave 59 on the rear end of the frame of the feed-table to the drum 56, thence around said drum to the sheave 59, and thence to a second post or anchor 60, Fig. 3. 61 is a second rope, which extends from an anchor 58' around a sheave 62, journaled at the front end of the truck 11, thence around the drum 56 back to the sheave 62 to an anchor 60'. The rope 61 is crossed between the drum 56 and the sheave 62, so that the motion transmitted by rotation of the drum to the sheaves at both ends of the table shall be in the same direction. The operation of this part of the apparatus is as follows: Suppose the parts to be in the positions shown in Figs. 1 and 3. If by means of the valve 33 water is admitted to the front end of the cylinder 35 and exhausted from the rear end, the back motion of the piston 50 and rack 51 thereby caused will move the drum 56 and sheaves 59 and 62 in the direction of the arrows $a$, and will therefore draw on the rope in the direction of the arrows $b$, and will pull the table with its supporting-wheels on the tracks 10 in the direction of the arrow $c$, so as to move the same laterally in front of the rolls. By reversing the motion of the cylinder 35 the table will be caused to travel laterally in the opposite direction. In practice I have found this mechanism for moving the tables to be of great advantage, because of the simplicity and durability of its construction and the certainty with which the work is effected and the uniformity of motion imparted to the table, whereby both ends are caused to travel in unison without dragging or undue strain on one end as compared with the other. Nevertheless, while I intend to claim specifically herein the use of the motor located on the table and moving therewith, I do not intend in such of the claims as cover the use of the flexible traction ropes or cables to exclude a construction in which the motor is fixed to the mill-floor independently of the table and is connected with one or both feed-tables by flexible connections, so as to move the same laterally in either direction. In the latter case it will be convenient to connect the tables on both sides of the rolls with the same motor, while in the construction shown in the drawings I find it desirable to employ a separate independently-operating motor on each of the tables. In the use of this motor it is desirable to employ automatically-acting means for checking its motion as the table reaches the desired positions in front of the rolls, since otherwise through carelessness of the operator in suddenly stopping the travel of the table serious damage may be occasioned to the mechanism from the violent jar of the heavy parts. To this end I employ the device shown in Figs. 8 and 12, in which 63 is a valve, which is interposed in the pipe 34, and is constructed with a double disk, (shown in Fig. 12$^b$,) so that the water-pressure on the valve when the water is exhausting from the front end of the cylinder 35 shall tend to close the disk and to cut off the water-supply, and that when the water is flowing into the front end of the cylinder the pressure shall tend to open the disks and permit free passage to the water. The stem 65 of this valve may be operated by means of a foot-lever 67, which is situate on the platform 66 of the feed-table, on which stands the workman who works the valve 33 and the valve controlling the roller-driving motor. 68 is an adjustable set-screw arranged in the valve 63 in position to limit the motion of the valve-stem and to prevent the valve from closing altogether. 69 is a lever, which is fulcrumed to a standard 70, and is connected to the valve-stem at the point 71. From thence the lever extends downwardly, and at its end is provided with an anti-friction roller 72. Along the path described by the end of the lever 69 in the lateral motions of the table are cam-strips 73, which are situate intermediately between the positions occupied by the end of the lever when the table is opposite the different passes or sets of rolls. The operation of this device is as follows: When the valve 33 is opened, so as to move the table laterally in the direction of the arrow $c$, Fig. 1, the valve 63 is automatically closed as nearly as possible by the passage of water through the pipe 34, so as to limit materially the volume of water which exhausts from the rear end of the cylinder. The feed-table, therefore, begins its lateral motion quite slowly and continues in such slow motion until the operator depresses the foot-lever 67, so as to open the valve, or until the end of the lever 69 engages the first cam-strip 73, when it will raise said lever so as to open the valve and to permit the full volume of water to exhaust from the cylinder. The speed of the table is thus accelerated and continues so until the end of the lever has passed the cam-strip, at which time the valve will automatically move to close the ports to limit the exhaust and to slacken the speed of the table. The motion of the table being thus slowed, the main valve 33 may be closed to cut off the water entirely without producing the dangerous concussions above mentioned. On the back travel of the table the valve 63 remains in its partially-closed condition until opened by the foot-lever or by the engagement of the lever 69 with the cam-strip, and it continues open until near the end of the travel of the table, when the said valve is closed by operating the foot-lever so as to limit the supply of water to the cylinder before the main valve 33 is closed. It will be understood that when the table moves in the direction of the arrow $a$ the pipe 34 acts as the exhaust-pipe to the cylinder, and when it moves in the opposite direction said pipe acts as the water-supply pipe. I may also use automatic mechanism for closing the valve 33 as the table reaches the limits of its travel. This is illustrated in Figs. 8 and 12$^a$, in which 74 represents a downwardly-projecting rod, which is connected with the stem of the valve by the system of levers clearly shown in Fig. 8. This rod 74 moves vertically in slide-bearings 75, and at its end has an anti-friction roller 76, which in the travel of the table engages projections or stationary cams 77, the action of which thereon is to lift the rod 74 at the time when the table is at the desired position and to close the main valve 33. Other mechanical contrivances, operating substantially as above described, such as will suggest themselves to a skilled mechanic, may be employed for automatically operating the valves 63 and 33, and I desire to cover such in the claims of this patent. It will be noticed that the stem of the valve 33 is also provided with a hand-lever 33$^a$, by which it may be operated, said lever being arranged, preferably, in the manner of an engine reverse-lever with a quadrant and latch, the connecting-levers between the rod 74 and the valve being arranged, as shown in Fig. 8, so as to afford no obstacle to the working of the valve either by the hand-lever or automatically by the rod 74.

V. *The manipulator.*—In the drawings I have shown but one of the feed-tables provided with a manipulator for shifting the metal laterally and centering it properly with relation to the pass of the rolls, since in practice this is all that is found necessary; but it will be understood that, if desired, both feed-tables may be provided with such mechanism. Referring to Figs. 1, 10, and 11, 78 and 79 are movable guide-bars, whose rear ends are pivotally connected at points 80 to the frame of the feed-table at the ends of the stationary guide-rails 92, and which converge thence in the direction of the rolls, their forward portions being substantially parallel. 31 is a power-cylinder, which is set transversely on the feed-table frame, and 82 is a cross-head secured to the piston 81 of said cylinder and adapted to move in a suitable slideway 83. 84 is a rock-lever, which is pivoted at a middle point in said cross-head, one arm being connected by a rod 85 to the guide-bar 78, and the other arm connected by a rod 86 to the guide-bar 79. 88 is a crank-arm projecting from a shaft, which is secured to the pivotal axis of the rock-lever 84. Said crank-arm has at its outer end a projecting pin 87. The parts just described move with the table in its rise and descent before the rolls. 89 and 90 are vertically-adjustable stops, which are so situate and adjusted as to respectively engage the pin on the crank-arm 88 when the table approaches its extreme positions in its rise and descent. When the table rises into position in front of the upper pass of the three-high rolls, the engagement of the stop 89 with the crank-arm will cause a rotation of the latter, so as to turn the lever 84 on its axis, and thereby to move the guide-bars 78 and 79 laterally away from each other, thus opening the said guide-bars into position to receive between them the metal piece as its emerges from the rolls. When, however, the table descends, the engagement of the crank-arm with the stop 90 causes an axial motion of the rocking lever 84 in the opposite direction and will bring the guide-bars toward each other to a distace apart about equal to the width of the metal piece, thus centering said piece into exact alignment with the pass of the rolls. In case the device is applied to the side of the rolls on which the metal piece enters the upper pass and emerges from the lower pass the mechanism is varied by ordinary mechanical expedients, so that the guide-bars shall separate when the table descends and shall approach when the table rises. In order that I may adjust the extreme limits of approach and separation of the guide-bars, I make the arms 85 and 86 in sections, secured together by slotted joints and set-screws 91. The centering of the metal effected as above described is automatic; but I may also move the piece laterally on the table by projecting or retracting the piston of the cylinder 31, which carries with it the cross-head 82, the lever 84, and the guide-bars. This cylinder is controlled, as above explained, by means of the valve 29 on the feed-table frame. The manipulator above described has many advantages in saving labor usually required in shifting and centering the metal on the feed-table. Its construction may be modified in divers ways, and I intend to claim herein, broadly, the automatically-acting device for centering the piece whether it be used with the shifting-cylinder or not.

Figure 9:
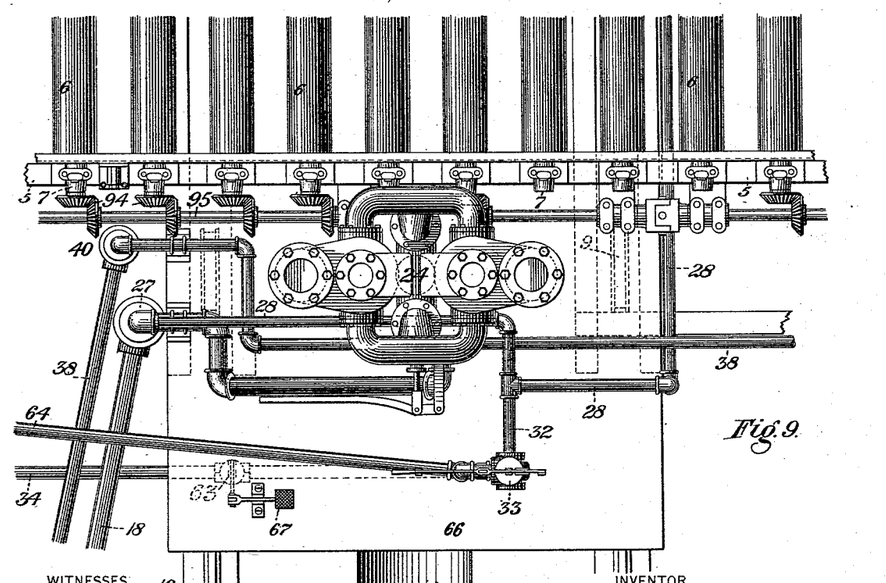
Fig. 9 is a plan view thereof.

VI. *The feed-roller-driving gearing.*—Referring to Figs. 4, 9, 10, 11, and 16, each of the necks of the feed-rollers 6 has its bearings in a semi-tubular sleeve 93, which is externally formed with a partly-spherical surface, and which fits on a pillow-block 7 and is covered by a cap, both the pillow-block and the cap being internally recessed to conform to the sphericity of the sleeve 93. The consequence of this construction is that if in the heavy strains to which the feed-rollers are subjected in the operation of the feed-table they become at all canted or tilted the sleeves 93 will automatically adjust themselves, so as to afford to the feed-roller a perfect bearing in such disturbed position. The necks of the feed-rollers of each feed-table outside their bearings are connected by miter-gearing 94 with a driving-shaft 95, which is driven by the motor 24 and is provided at the place of connection between the front and rear sections of the table with a universal joint 96, which prevents the tilting of the table from interfering with the rotation of the shaft. For the purpose of driving the feed-rollers I preferably construct the motor 24 to be operated hydraulically, since I am thereby enabled to control the feed-rollers more readily and to drive them positively either at a high or low rate of speed. The external construction of one of these motors is shown in Figs. 8 and 9. It is unnecessary to describe the same in detail, since for the purpose of this invention any motive engine adapted to be driven by steam or water may be employed.

The advantages of my improvement will be appreciated by those skilled in the art. The apparatus is simple in construction, easy to operate, and very efficient in its action.

Without intending to limit myself strictly to the precise forms of the several parts which I have shown and described, I claim—

1. The combination of the laterally-movable feed-table, flexible connections secured to the feed-table and extending to both sides thereof, and a power-driven drum mechanically connected with the flexible connections, substantially as and for the purposes described.

2. The combination, with the laterally-movable table and the motor-cylinder thereby carried, of a fluid-supply pipe having a radially-swinging joint and a wheel or carriage on which the joint travels, substantially as and for the purposes described.

3. The joint, substantially as shown in Fig. 15, consisting of the combination of the box 26, the pipe 18, and the pipe 25, entering the same through a stuffing-box and having a flaring mouth, which bears against a shoulder in said box 26, substantially as and for the purposes described.

4. In combination with a laterally-movable feed-table, a power-driven drum carried therewith and ropes or chains extending from the drum and attached to points at both sides of the table, whereby the table may be moved laterally in either direction, substantially as and for the purposes described.

5. In combination with a laterally-movable feed-table, a power-driven drum carried therewith and ropes or chains extending from the drum and attached to points at both sides of the table and opposite to parts of the table on both sides of the middle of its length, whereby the table may be moved laterally in either direction, substantially as and for the purposes described.

6. The combination, with the laterally-movable feed-table, of a drum 56, carried thereby, a motor 35, by which the drum is operated, and ropes or chains extending from the drum to points at the sides of the table, substantially as and for the purposes described.

7. The combination, with the laterally and vertically movable carriage and feed-table having feed-rollers, of a motor carried thereby and adapted to move the feed-table laterally, a motor for driving the feed-rollers, a motor for raising the feed-table, both carried by the carriage, and valves controlling the motor for moving the same laterally, a valve controlling the feed-roller-driving motor, also carried by the carriage, and a valve separate from the carriage and controlling the motor for raising the feed-table, substantially as and for the purposes described.

8. The combination, with the feed-table, of a manipulator for centering the metal piece, comprising two arms, between which the piece passes, and mechanism for moving said arms simultaneously in opposite directions, substantially as and for the purposes described.

9. The combination, with the feed-table, of a manipulator for centering the metal piece, comprising two arms between which the piece passes, mechanism for moving said arms simultaneously in opposite directions, and mechanism for moving said arms laterally in the same direction, substantially as and for the purposes described.

10. The combination, with the vertically-movable feed-table, of a manipulator for centering the metal piece, comprising two arms 78 and 79, a lever to the opposite arms of which they are connected, and mechanism, such as a crank, by which on the rise or fall of the table the said lever shall be rocked and the arms moved oppositely, substantially as and for the purposes described.

11. The combination, with the vertically-movable feed-table, of a manipulator for centering the metal piece, comprising two arms 78 and 79, a lever to the opposite arms of which they are connected, mechanism, such as a crank, by which on the rise or fall of the table the said lever shall be rocked and the arms moved oppositely, and a motor for moving said lever and arms laterally, substantially as and for the purposes described.

12. The combination, with the vertically-movable feed-table, of a manipulator for centering the metal piece, comprising two arms 78 and 79, a lever to the opposite arms of which they are connected, mechanism, such as a crank, by which on the rise or fall of the table the said lever shall be rocked and the arms moved oppositely, a motor for moving said lever and arms laterally, and adjustable stops against which said crank engages, substantially as and for the purposes described.

13. The combination, with the vertically-movable feed-table and the feed-rollers, of journal-bearings for the feed-rollers, said journal-bearings having spherical outer surfaces and concave sockets in which said bearings are set, substantially as and for the purposes described.

14. The combination, with the laterally-movable feed-table and the motor for so moving the same, of a valve controlling said motor and mechanism operated automatically by travel of the feed-table and connected with the valve to stop the operation of the motor, substantially as and for the purposes described.

15. The combination, with the laterally-movable feed-table and the motor for so moving the same, of a valve controlling said motor, a valve adapted to check the supply of motive fluid to the motor without cutting off the same entirely, and mechanism, such as a movable rod or lever, adapted to be moved automatically by travel of the feed-table and connected with the valve to operate the same at determined points, substantially as and for the purposes described.

In testimony whereof I have hereunto set my hand this 1st day of November, A. D. 1889.

WILLIAM H. MADDOCK.

Witnesses:
  W. B. CORWIN,
  THOMAS W. BAKEWELL.